Figure 1:
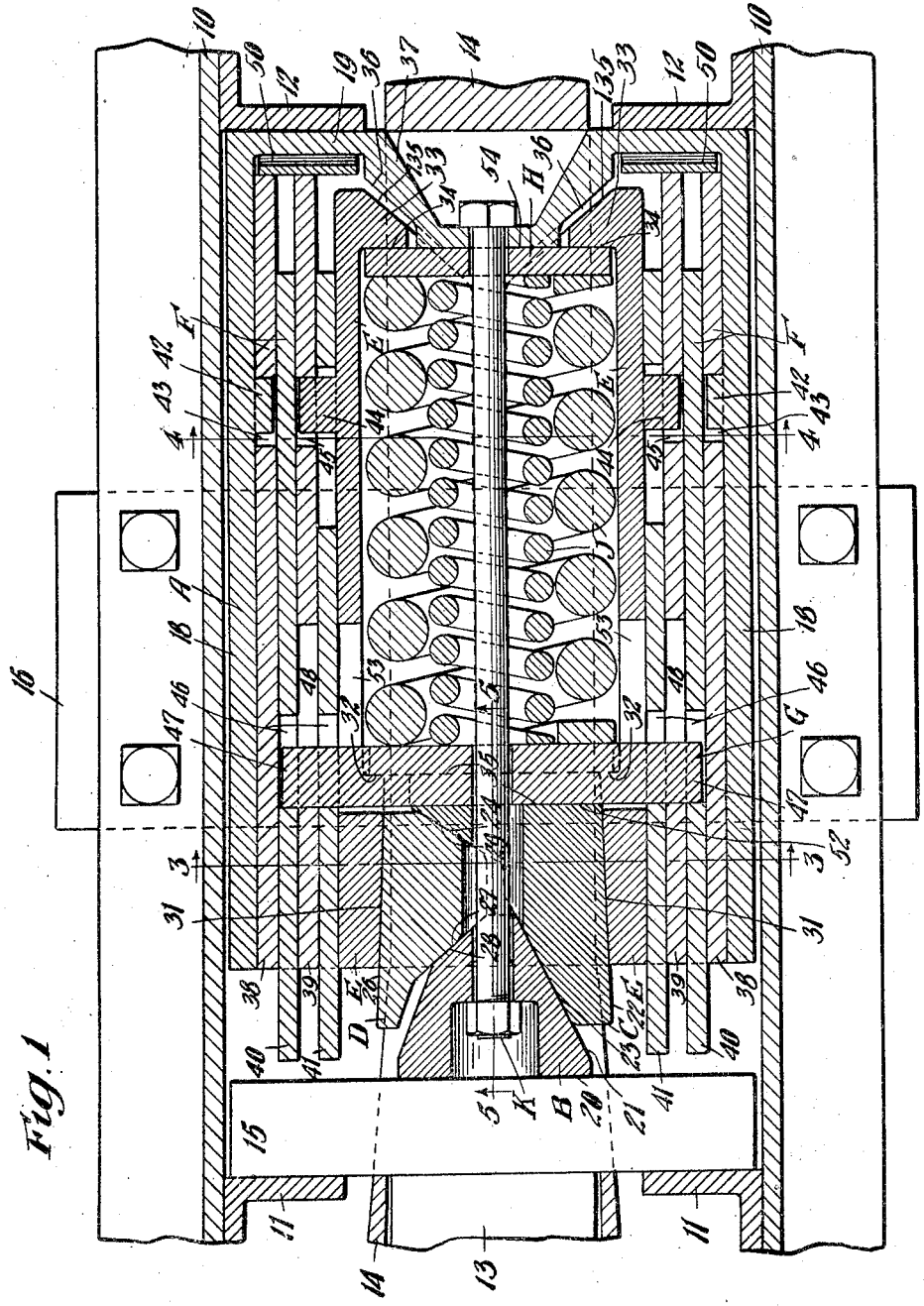

Sept. 29, 1925.
S. B. HASELTINE
1,555,667
FRICTION SHOCK ABSORBING MECHANISM
Filed Sept. 21, 1923   2 Sheets-Sheet 2
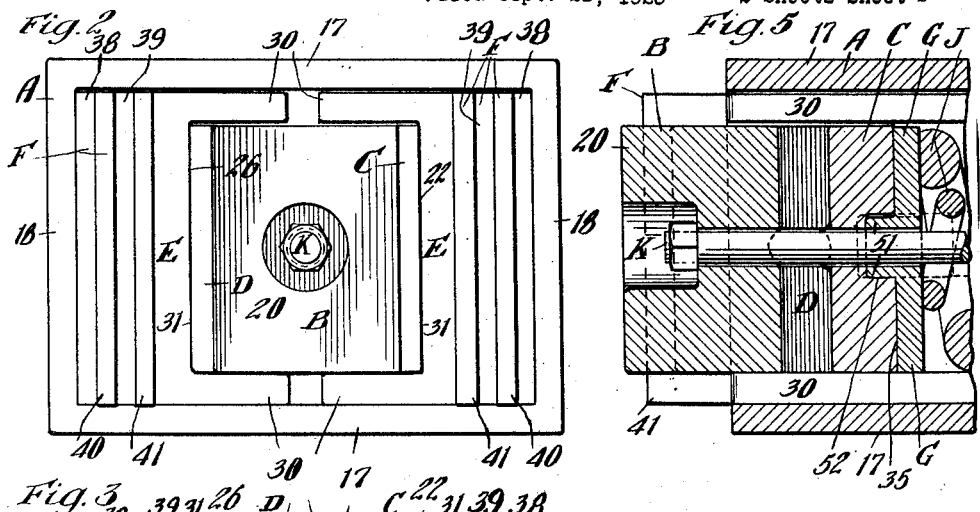
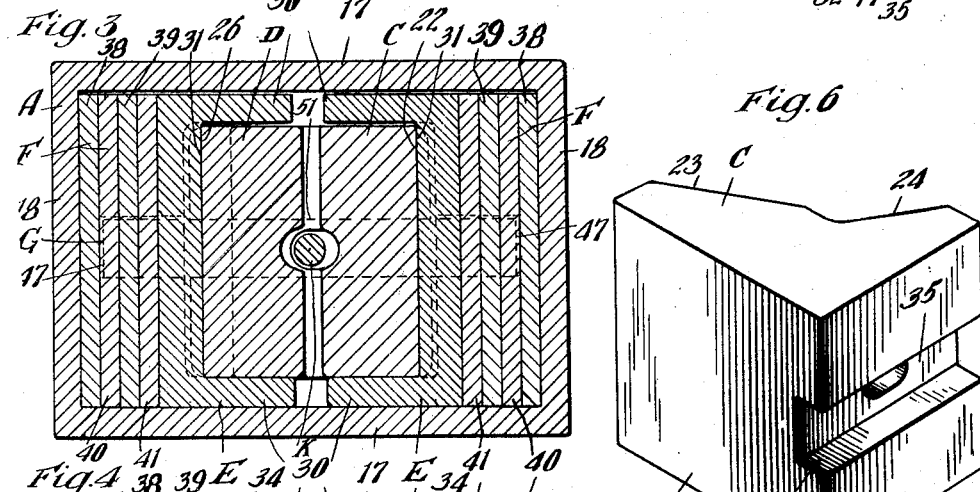
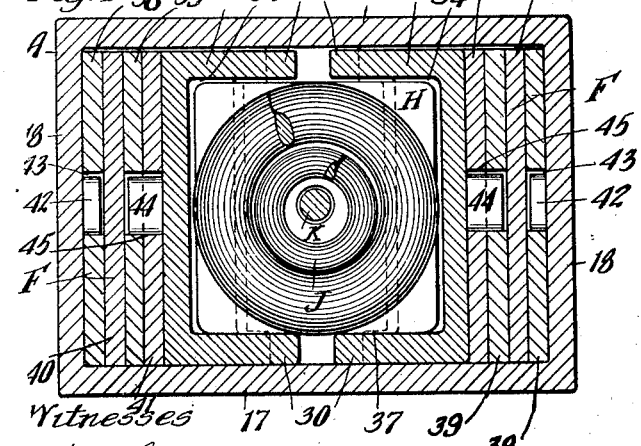
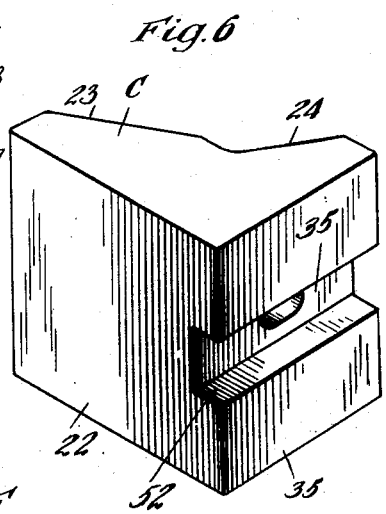
Inventor
Stacy B. Haseltine
By George I. Haight
His Atty.

Patented Sept. 29, 1925.

1,555,667

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 21, 1923. Serial No. 663,960.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, more particularly adapted for railway draft riggings, wherein is obtained high capacity due to the large friction areas, and wherein a lateral pressure creating means having the attributes of a blunt and keen angle wedge system is made use of to assure quick and certain release of a plurality of friction plates.

Another object of the invention is to provide a friction shock absorbing mechanism of the type referred to, wherein a graudated action in both compression and release is obtained, by producing a preliminary action of the followers and wedges prior to the differential wedge action, and effecting relative movement of the friction plates after the differential wedge action has been inaugurated.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a front end elevational view of the shock absorbing mechanism proper. Figures 3 and 4 are vertical, transverse, sectional views corresponding respectively to the lines 3—3 and 4—4 of Figure 1. Figure 5 is a vertical, longitudinal, sectional view corresponding substantially to the line 5—5 of Figure 1, and Figure 6 is a detailed perspective view of one of the wedge blocks used in connection with my improved mechanism.

In said drawings, 10—10 denotes channel draft sills of a railway car underframe, to the inner faces of which are secured front stop lugs 11 and rear stop lugs 12; a portion of the drawbar is indicated at 13, to which is attached a hooded yoke 14. The shock absorbing mechanism proper, including a front follower 15 is disposed within the yoke 14, and the movable parts of the draft rigging are supported by a detachable saddle plate 16.

The improved shock absorbing mechanism proper, as shown, comprises, broadly, a shell or casing A; a central wedge block B; wedge shoes C and D; a pair of pressure transmitting elements E—E; two groups of friction plates F—F; front and rear spring followers G and H; a spring resistance J; and a retainer bolt K.

The casing or shell A is of rectangular hollow box-like form, having top and bottom walls 17—17, parallel spaced side walls 18—18, and an integral rear, vertical wall 19, the latter functioning as the rear follower of the mechanism in conjunction with the corresponding stop lugs.

The central wedge element B is preferably in the form of a block having a front or outer flat bearing surface 20 adapted to coact with the inner face of the follower 15. Said block is also provided with a wedge face 21 extending at a relatively acute angle with respect to the axis of the mechanism. The element B is also provided on the side opposite to the wedge face 21 with another inclined face 28 extending at a relatively blunt angle with reference to the axis of the mechanism.

The wedge friction shoe C is preferably in the form of a block, and is formed at its out side with a longitudinally extending flat friction surface 22 extending at a relatively keen angle with reference to the longitudinal axis of the mechanism. The element C is also provided with an inclined wedge face 23 extending at the same angle as and cooperable with the wedge face 21 of the wedge B disposed at one side of the central line of the mechanism and with an additional inclined face 24 on the other side of the center line of the mechanism, said face 24 extending at a relatively blunt angle with reference to the longitudinal axis of the mechanism and coacting with the rear end of the wedge friction shoe D. On its inner end the wedge shoe C is provided with a transversely extending flat face 35 bearing on the front side of the spring follower G, the latter being interposed between the wedge friction shoe C and the front end of the spring resistance J.

The wedge friction shoe D, also preferably in the form of a block, is provided on its outer side with a flat friction surface 26 extending at a relatively keen angle with reference to the longitudinal axis of the mechanism. Upon reference to Figure 1, it will be seen that the flat friction surfaces 22 and 26 of the shoes C and D converge rearwardly of the mechanism. On the inner side, that is, the side nearest the axis of the mechanism, the friction shoe D is formed with a lateral enlargement, on the front side of which is provided an inclined face 27 cooperable with the inclined face 28 of the wedge element B. On the rear side of said enlargement another face 29 is provided, said face 29 extending at a relatively blunt angle with reference to the longitudinal axis of the mechanism and cooperating with the wedge face 24 of the wedge friction shoe C.

The pressure transmitting elements E are two in number and arranged at opposite sides of the spring resistance and wedge shoes. The wedge pressure transmitting elements E are of like construction, each being provided with inwardly projecting longitudinally disposed horizontal, stiffening flanges 30—30 at the upper and lower edges thereof corresponding in length to said elements. Each of the pressure transmitting elements E is also provided with an inner flat friction surface 31 at the front end thereof extending at a relatively keen angle with reference to the longitudinal axis of the mechanism, the faces 31 of the opposed elements converging rearwardly of the mechanism and coacting respectively with the flat surfaces 22 and 26 of the shoes C and D. Rearwardly of the face 31, each of the elements E is cut away to provide a transversely extending shoulder 32 adapted to cooperate with the spring follower G. The rear end of each of the pressure transmitting elements E is provided with an inwardly extending lateral projection 33 presenting a transversely extending inner abutment face 34 adapted to coact with the rear spring follower H. The projection 33 of each element is also provided with a beveled rear face 135 adapted to coact with a correspondingly beveled face 36 on an inwardly projecting hollow boss 37 on the rear wall 19 of the casing, the boss 37 being provided with two such faces 36 at opposite sides of the longitudinal center line of the mechanism, each adapted to coact with the beveled rear face 135 of the corresponding pressure transmitting element E.

The friction plates F—F are arranged within the casing A and comprise two oppositely disposed groups. As herein shown, the groups of plates F each comprise two plates 38 and 39 and two plates 40 and 41, the plates 38 and 39 being alternated with the plates 40 and 41 with the plate 38 of each group arranged outermost and in contact with the inner face of the adjacent side wall 18 of the casing A and the plate 41 arranged innermost and having frictional engagement with the outer surface of the adjacent pressure transmitting element E. The friction plates 38 and 39 of each group are substantially stationary and normally have their front ends alined with the front end of the shell A. To retain each plate 38 in assembled relation with the casing, the adjacent casing wall 18 is provided near the rear end thereof with a short boss 42 adapted to engage a corresponding recess 43 in the plate 38, the recess being of a slightly greater longitudinal dimension than the corresponding lug so that the plate may have limited movement relatively to the casing. The plate 39 is also substantially fixed with reference to the casing and is retained within the latter by a lug 44 projecting laterally from the outer side of the corresponding pressure transmitting element and engaging with in a corresponding recess 45 in the plate, the recess 45 being of a longitudinal dimension to permit slight relative movement of the plate 39 and the casing A. The plates 40 and 41 of each group F protrude outwardly beyond the end of the casing and have their front ends normally spaced a slight distance rearwardly of the follower 15 and the rear ends spaced a considerable distance from the rear wall 19 of the casing. The plates 40 and 41 of each group are movable relatively to the plates 38 and 39 and each of the plates 40 and 41 is provided with a relatively long longitudinally extending slot 46 disposed centrally between the upper and lower sides of the same. The slots 46 are adapted to receive arms 47 laterally extending at opposite sides from the front spring follower G, the arms 47 being adapted to coact with the front walls of the slots 46 to restore the plates 40 and 41 of each group to normal position, the slots 46 being appreciably longer than the width of the arms 47 so that the plates 40 and 41 of each group may move relatively to said arms. Upon reference to Figure 1, it will be seen that the plate 39 of each group which is disposed between the plates 40 and 41 is provided with an elongated slot 48 alined with the slots 46 of the plates 40 and 41 to accommodate the corresponding lateral arm 47, projecting therethrough, for longitudinal movement. The plate 41 of each group is also provided with a relatively long longitudinally extending slot disposed in alinement with the opening 45 of the adjacent plate 39 and adapted to accommodate the corresponding lug 44 for relative longitudinal movement.

A vertically arranged curved spring plate 50 is preferably interposed between the rear ends of the plates 38 and 39 of each group and the rear wall 19 of the casing, to yieldingly resist rearward movement of the plates.

The spring follower G is in the form of a rectangular plate having the laterally extending arms 47 formed integral therewith, and as the arms 47 are of relatively greater thickness than the plate, the plate is provided with a transversely extending strengthening rib 51 coinciding with the arms and adapted to be accommodated within a transversely extending slot 52 in the wedge shoe C. To permit the spring follower G to move relatively to the pressure transmitting elements E, the latter are provided with longitudinally extending alined slots 53 near their front ends to accommodate the oppositely projecting arms 47.

The spring follower H is in the form of a flat plate interposed between the rear end of the spring resistance and the boss 37 in abutting relation with flat face 54 at the front end of the latter.

The shock absorbing mechanism is held in assembled relation and under initial compression by the retainer bolt K, extending through the inner coil of the spring resistance J and alined openings in the wedge block B, wedge shoes C and D, front spring follower G, rear spring follower H and the boss 37, the front and rear ends of the bolt being anchored respectively within the hollow wedge block B and the boss 37.

As the various wedge and friction surfaces become worn, compensation therefor is had by the expansive action of the spring resistance J which is under initial compression, as hereinbefore described.

When the parts are in normal position, as clearly shown in Figure 1, the friction plates 40 and 41 protrude from the shell and have their front ends slightly spaced rearwardly from the inner face of the follower 15, the front faces of the arms 47 of the spring follower G engaging the front walls of the slots 46 in said plates, the spring follower G engaging the transverse shoulders 32 at the front end portions of the pressure transmitting elements E, thereby holding the front ends of the latter substantially in alinement with the front end of the shell and the spring plates 50 yieldingly engaging the rear ends of the plates 38 and 39 and holding the same in their outermost position with the rear walls of the slots 43 and 45 engaging the corresponding lugs 42 and 44 of the casing and pressure transmitting elements.

Assuming an inward or buffing movement of the draw bar, the operation of the improved shock absorbing mechanism is as follows: The front follower 15 will be forced inwardly by the inward movement of the draw-bar moving the central wedge element B inwardly in unison therewith. As pressure is applied to the element B, the initial tendency is for the latter to slip or move inwardly of the shell with respect to the keen angle shoe C on the two co-operating wedge faces 21 and 23, it being evident that this tendency is in a manner to spread laterally the friction unit consisting of the three elements. Due to the friction existing between the wedge unit and the pressure transmitting elements E, the latter will be forced inward slightly with the wedge unit until the beveled rear faces 135 thereof engage the bevel faces 36 on the boss 37, whereupon rearward movement of the elements E will be arrested and a proper spreading action of the rear ends of the elements E effected. It will be evident that the elements E are thus forced outwardly at both ends during the remainder of the compression stroke and due to the stiffening of the elements E by reason of the reinforcing flanges 30 thereon the friction plates E are pressed into close face to face contact throughout their length. Buckling of the friction plates, due to the pressure being applied at the opposite ends thereof, is thus avoided. As the elements E move inwardly, the plates 39 and 41 will also be carried inwardly a slight distance, the plates 39 being forced inwardly by the lugs 44 on the elements E, and the plates 41 being moved due to the friction existing between the same, the plates 41 and the elements E. As the three elements, B, C and D, cooperating as a unit, move inwardly of the shell, the shoes C and D travel along the inclined faces 31 of the corresponding pressure transmitting elements E, thereby producing a lateral inward movement of the elements C and D, with respect to the remaining element B. This lateral movement of the elements C and D produces a separating wedge action between the two elements B and C, thereby slightly elongating the unit in the direction of the applied force and creating a very high resistance between the unit and the pressure transmitting elements E, it of course being understood that yielding resistance is afforded, the entire unit by the spring element J. In this connection, it will be obvious that the sets of inclined faces 28 and 27, and 29 and 24, on account of their relative blunt angularity with respect to the center line of the mechanism or the line of applied force will readily accommodate the action above described and will act somewhat in the manner of a safety valve to prevent bursting of the shell while the highest friction resistance is still maintained. During the initial movement of the follower 15 and the wedge unit, no actuation of the plate 40 and only slight actuation of the plate 41 will take place, but on the contrary the entire wedging system including the wedge B, wedge shoes C and D together with the spring follower G, will be moved longitudinally inward of the casing independently of any appreciable movement of the plates 40 and 41 after engagement of the elements E with the boss 37. During this initial portion of the compression stroke, it will be evident that the arms 47 and the follower G will be moved from engagement with the front walls of the slots in the plates 40 and 41 and slightly from the shoulders 32 of the pressure transmitting elements E, respectively. As the front follower continues to move rearwardly the plates 40 and 41 are engaged thereby and thereafter move in unison with the follower relatively to the plates 38 and 39, thus generating the desired frictional capacity supplemental to the spring capacity. During the first portion of the inward movement of the plates 40 and 41, the plates 38 and 39 will move rearwardly therewith to a limited extent, resisted by the action of the curved spring plates 50 until the spring plates 50 have been flattened out, whereupon the plates 38 and 39 will be held stationary. It will be evident, that in addition to the friction created between the relatively movable plates, frictional resistance will also be offered to the rearward movement of the plates 41 by the outer flat surfaces of the pressure transmitting elements on which the plates 41 slide.

Although the inner ends of the elements E are herein shown and described as normally spaced from the boss 37, it will be evident that this is not essential to the proper operation of the gear and that this clearance may be omitted so that the faces 135 and 36 will at all times be in contact and thereby effect an immediate spreading action of the rear ends of the plates when the elements E are forced rearwardly.

Upon discontinuance of the actuating force, the wedge element B will readily release itself with respect to the elements D and C on account of the relatively blunt angle of the cooperating faces 28 and 27 and also on account of the obtuse or blunt included angle between the wedge face 23 and the inclined face 27 of the two shoes. This movement of the pressure wedge element B with respect to the shoes, in turn serves to permit collapse of the entire unit which may then be projected outwardly by the action of the springs. The relative convergence of the friction faces 31 of the pressure transmitting elements E also facilitates the restoration of the parts to normal position during release action. This releasing action of the wedge unit is substantially instantaneous and extremely sensitive for the reason that there is no movement of any of the friction plates during the initial part of the release action. After the collapse of the wedging system and forcing of the same outwardly a limited distance, the pressure on the friction plates will have been reduced to substantially the minimum and upon the arms 47 of the front spring follower engaging the front walls of the slots in the plates 40 and 41, the latter may be easily projected outwardly to their normal position. Near the end of the release movement, the follower G engages the shoulders 32 of the pressure transmitting elements E restoring the same to normal position. During the release action the spring plates 50 will also act to restore the plates 38 and 39 to normal position with the rear walls of the slots 43 and 45 thereof engaging the respective lugs 42 and 44. It will be evident that the shoulders 34 at the rear ends of the pressure transmitting elements engaging with the rear spring follower H serve to retain these elements within the casing. It will be observed further that any small shock and particularly the multitude of small shocks resulting from surging of the cars in a train, may be absorbed without any actuation of the friction plates and merely by the springs actuated through the pressure creating system.

I have herein shown and described what I now consider the preferred manner of carrying out my invention, but the same is merely illustrative and I contemplate such changes and modifications that come within the scope of the claims appended hereto.

I claim:

1. In a friction shock absorbing mechanism, the combination with a shell; of a pressure transmitting and lateral pressure creating means within said shell; a spring resistance; a plurality of relatively movable friction plates within the shell divided into two groups on opposite sides of said means; means for bracing said plates, said means including a pressure transmitting element interposed between each group of plates and said means extending lengthwise of said plates, said element having limited movement inwardly of the shell; a front follower movable relatively toward and away from the shell, co-acting with said means and adapted to engage and move said plates relatively to each other after a predetermined movement of the follower and said pressure transmitting elements.

2. In a friction shock absorbing mechanism, the combination with a casing; of a front follower movable relatively toward and away from the casing; a lateral wedge pressure creating means within the casing co-acting with said front follower, said wedge pressure means including a pair of friction shoes; a spring resistance; a pair of longitudinally extending pressure transmitting elements disposed on opposite sides of said shoes, and having inwardly converging friction surfaces co-acting respectively with the shoes, said elements being mounted for limited movement inwardly of the casing and a plurality of longitudinally arranged relatively movable friction plates within the casing, said plates being divided into two groups on opposite sides of said pressure transmitting elements, alternate plates of said groups having engagement with the casing for limiting their movement, and the remaining plates of each group being adapted to be engaged and moved by said follower inwardly of the casing and relatively to said first named plates.

3. In a friction shock absorbing mechanism, the combination with a casing; of a front follower movable relatively toward and away from said casing; lateral wedge pressure creating means within said casing, adapted to be actuated by said front follower, said means including a pair of wedge shoes; a spring resistance co-acting with said shoes; a pair of longitudinally extending pressure transmitting elements disposed on opposite sides of said shoes, said elements having inwardly converging friction surfaces co-acting with the shoes and being movable rearwardly by the action of said shoes for a limited distance; means on said casing for limiting the inward movement of said pressure transmitting elements; a plurality of longitudinally arranged relatively movable friction plates within the casing, said plates being divided into two groups on opposite sides of said casing and co-acting with said elements, alternate plates of each group having slight longitudinal movement inwardly of the casing and being limited in their movement by engagement with the rear wall of the casing, and the remaining plates of each group being adapted to be engaged and moved by said follower longitudinally inwardly of the casing and relatively to said first named plates; and means co-acting with said spring for restoring said plates and pressure transmitting elements to normal position in sequence after actuation of said mechanism.

4. In a friction shock absorbing mechanism, the combination with a shell; of a spring resistance; and a friction unit within said shell, said unit comprising a plurality of elements each having engagement with the remaining elements of the unit on faces inclined to the line of the actuating force, the element initially receiving the actuating force tending to expand the unit transverse to the line of the actuating force, and one of the remaining elements operating to overbalance said tendency and expanding the unit in the direction of the applied force during a compression stroke, and a plurality of movable friction plates within the shell and responsive to the lateral pressure, said plates being divided into two groups on opposite sides of said friction unit and adapted to be compressed thereby.

5. In a friction shock absorbing mechanism, the combination with a shell; of a plurality of longitudinally disposed relatively movable friction plates within the shell said plates being divided into two groups at opposite sides of the shell; a longitudinally extending pressure transmitting element on the inner side of each group of plates; each of said elements having inner and outer friction surfaces, the inner surfaces, the inner surfaces of said elements converging slightly rearwardly of the shell; a spring resistance; and a wedge unit within said shell, said unit comprising, a pressure-receiving wedge element, and two friction shoes with each of which said wedge element has engagement on faces inclined to the line of the applied force, said shoes co-acting respectively with said converging surfaces and having also engagement with each other on faces inclined to the line of the applied force.

6. In a friction shock absorbing mechanism, the combination with a shell; of a plurality of longitudinally disposed relatively movable friction plates within the shell, said plates being divided into two groups at opposite sides of the shell; a longitudinally extending pressure transmitting element on the inner side of each group of plates; each of said elements having an inner and outer friction surface, the inner surfaces of said elements converging slightly rearwardly of the shell; a spring resistance; and a wedge unit within said shell interposed between and coacting with said pressure transmitting elements, said unit comprising, a pressure-receiving wedge element and two friction shoes, said wedge element and one shoe having engaging faces extending at a relatively acute angle with respect to the line of the applied force, said wedge element and the other shoe having engaging faces extending at a relatively blunt angle with respect to the line of the applied force and said two shoes, co-acting respectively with said converging surfaces and having engaging faces extending at a relatively blunt angle with respect to the line of the applied force.

7. In a friction shock absorbing mechanism, the combination with a friction shell; of a plurality of longitudinally disposed relatively movable friction plates within the shell, said plates being divided into two groups at opposite sides of the shell; a pair of longitudinally disposed pressure transmitting elements within the shell, said elements having rearwardly converging inner friction surfaces, one of said elements being disposed on the inner side of each of said groups of plates, said elements having limited movement inwardly of the shell; a spring resistance; a wedge unit within the shell and cooperating with the converging surfaces of said pressure transmitting elements, said unit comprising, a pressure receiving wedge element and opposing friction shoes, said wedge element and one of said shoes having engaging faces extending at a blunt angle with respect to the axis of the shell, said pressure receiving element and opposed shoe having engaging faces extending at a keen angle with respect to the axis of the shell; and a front follower movable relatively toward and away from said shell and coacting with said wedge unit, said follower being adapted to move said plates relatively to each other after the movement of the pressure transmitting elements has been arrested and a predetermined wedging action has been set up.

8. In a friction shock absorbing mechanism, the combination with a shell; of a pressure transmitting and lateral pressure creating means within said shell; a spring resistance; a plurality of relatively movable friction plates within the shell divided into two groups on opposite sides of said means; longitudinally stiffened means for bracing said plates against bending, said means including a pressure transmitting element interposed between each group of plates and said means; a front follower movable relatively toward and away from the shell, coacting with said means and adapted to engage and move said plates relatively to each other after a predetermined movement of the follower and said pressure transmitting means.

9. In a friction shock absorbing mechanism, the combination with a column element; of a spring resistance; a plurality of relatively movable friction plates cooperating with said column element; a pressure transmitting and lateral pressure creating means for placing said plates under lateral pressure and forcing the same against said column; a lateral pressure transmitting bracing means cooperating with said plates and said lateral pressure creating means, said bracing means being provided with stiffening members; a front follower movable relatively toward and away from the column and coacting with said lateral pressure creating means and adapted to engage and move said plates relatively to each other during a compression stroke of the mechanism.

10. In a friction shock absorbing mechanism, the combination with a shell; of a pressure transmitting and lateral pressure creating means within said shell; a spring resistance; a plurality of relatively movable friction plates within the shell divided into two groups on opposite sides of said means; a pressure transmitting bracing element interposed between each group of plates and said means, said element being provided with stiffening flanges to strengthen the same longitudinally; a front follower cooperating with said element, said follower and element being movable relatively toward and away from the shell and coacting with said means and adapted to engage and move said plates relatively to each other after a predetermined movement of the follower and said pressure transmitting element.

11. In a friction shock absorbing mechanism, the combination with a casing; of a plurality of longitudinally extending relatively movable friction plates within said casing; means for creating relative longitudinal movement between said plates; wedging means adjacent one end of said plates for creating a lateral pressure thereon; a pair of pressure transmitting elements interposed between said wedging means and said plates, substantially of the length of the latter, and provided with stiffening means; and a secondary lateral pressure creating means adjacent the other end of said plates and elements, whereby said elements are adapted to distribute the lateral pressures uniformly over said plates throughout their length; a spring resistance; and means actuated by the latter whereby said plates, elements and wedging means may be restored to normal position after a compression stroke.

In witness that I claim the foregoing I have hereunto subscribed my name this 18th day of September, 1923.

STACY B. HASELTINE.